(12) United States Patent
Boegli et al.

(10) Patent No.: US 7,231,713 B2
(45) Date of Patent: Jun. 19, 2007

(54) METHOD OF RECONDITIONING A TURBINE BLADE

(75) Inventors: Andreas Boegli, Vogelsang-Turgi (CH); James George Ritchie, Ennetbaden (CH); Slawomir Slowik, Stetten (CH); Heinrich Stuessi, Unterengstringen (CH)

(73) Assignee: ALSTOM Technology Ltd., Baden (CH)

( * ) Notice: Subject to any disclaimer, the term of this patent is extended or adjusted under 35 U.S.C. 154(b) by 524 days.

(21) Appl. No.: 10/892,136

(22) Filed: Jul. 16, 2004

(65) Prior Publication Data

US 2005/0042092 A1 Feb. 24, 2005

(30) Foreign Application Priority Data

Jul. 23, 2003 (EP) .................................. 03405557

(51) Int. Cl.
*B23P 6/00* (2006.01)
*B23K 9/04* (2006.01)

(52) U.S. Cl. ............... 29/889.1; 29/402.01; 29/402.02; 29/402.09; 29/402.16; 29/402.18

(58) Field of Classification Search ............... 29/889.1, 29/889.21, 889.7, 889.722, 402.01, 402.02, 29/402.04, 402.05, 402.06, 402.07, 402.08, 29/402.09, 402.16, 402.18, 402.19, 527.2
See application file for complete search history.

(56) References Cited

U.S. PATENT DOCUMENTS

| | | | |
|---|---|---|---|
| 4,285,108 A * | 8/1981 | Arrigoni .................... 29/889.1 |
| 4,291,448 A | 9/1981 | Cretella et al. |
| 5,083,903 A * | 1/1992 | Erdmann .................... 416/190 |
| 5,269,057 A * | 12/1993 | Mendham .................. 29/889.1 |
| 6,464,128 B1 * | 10/2002 | Messelling et al. ......... 228/119 |
| 6,914,210 B2 * | 7/2005 | Grossklaus et al. .... 219/121.45 |
| 2001/0006600 A1 | 7/2001 | El-Nashar et al. ............ 416/92 |
| 2003/0088980 A1 | 5/2003 | Arnold ....................... 29/889.1 |

FOREIGN PATENT DOCUMENTS

| | | |
|---|---|---|
| DE | 199 25 781 A1 | 7/2000 |
| EP | 0 287 371 A1 | 10/1988 |
| EP | 0 999 009 A1 | 5/2000 |
| EP | 1 327 702 A1 | 7/2003 |

OTHER PUBLICATIONS

Search Report from EP 03 40 5557.4 (Dec. 18, 2003).
Search Report from EP 04 10 3356 (Dec. 27, 2004).

* cited by examiner

*Primary Examiner*—Jermie E. Cozart
(74) *Attorney, Agent, or Firm*—Cermak & Kenealy, LLP; Adam J. Cermak

(57) ABSTRACT

A method of reconditioning a rotating blade (1) with a shroud (8) following the operation in a gas turbine, includes the application of a barrier (14) placed on the edge of the shroud (8) facing the edge of a shroud (8) of an adjacent blade having creep deformation. The barrier (14) prevents hot gas ingestion into a shroud cavity (10). It is prefabricated or built-up layer-by-layer by welding or laser cladding or other methods. Additionally, the mass of the shroud (8) is reduced in order to re-establish the initial mass of the shroud. A thermal barrier coating (15) is additionally applied to the surfaces of the shroud (8) that are exposed to the hot gas of the turbine. The method significantly increases the lifetime of the blade (1).

20 Claims, 3 Drawing Sheets

METHOD OF RECONDITIONING A TURBINE BLADE

This application claims priority to European patent application number 03405557.4, filed 23 Jul. 2003, the entirety of which is incorporated by reference herein.

BACKGROUND OF THE INVENTION

1. Field of the Invention

The invention relates to a method of reconditioning a rotating turbine blade following the use in a high temperature environment or as part of the production of a new blade and in particular to the reconditioning of the blade shroud.

2. Brief Description of the Related Art

Blade shrouds for gas turbines as disclosed in US 2001/0006600 are typically used to reduce primary leakages by providing a seal between the rotating blade and a stationary component, for example a honeycomb or abradable system fastened to the turbine inner casing. A typical shroud element includes a shroud platform and one or more knife-edges extending radially away from the platform with respect to the turbine rotor and towards the stationary component on the turbine casing. These knife-edges can be placed along the edges of the platform as well as on a center portion of the platform. A shroud cavity is defined by the knife-edges define together with the platform and the stationary component opposite the blade shroud.

A blade shroud constitutes an additional mass at the extreme radial distance from the blade root, which cause increased centrifugal forces and resulting stresses in the root region of the blade.

During operation of the turbine blade the shroud can be damaged by creep deformation or lifting of the shroud, mainly of the shroud platform. Such deformations of the shroud can lead to mismatches between adjacent blade shrouds and hot gas ingestion into to the shroud cavity with resulting over heating of the shroud.

Blade shrouds damaged in this way have until today been considered as irreparable. Therefore, they have been traditionally replaced by a blade with a complete new design aimed at an increased blade lifetime, which may include the design of cooling channels within the shroud in connection with a reduction of the weight of the shroud as suggested for example in US 2001/0006600.

DE 199 25 781 discloses a method for reshaping a turbine component by fixing the component to a matrix having a specified mould, immersing the component into an incompressible medium such as water or oil, and introducing a pressure wave into the medium. However, in this method the design of the blade and the driving force of the blade degradation is not changed and no increase in blade lifetime can result.

SUMMARY OF THE INVENTION

It is the object of the invention to provide a method of reconditioning a blade with a shroud following operation in a gas turbine, where one portion of the blade shroud has been deformed while a second portion has maintained its original shape. The method is intended to increase the blade's lifetime by preventing overheating of the shroud due to hot gas ingestion into a shroud cavity during further operation of the blade.

It is a second object of the invention to provide a method of fabricating a turbine blade with a shroud intended for first use in a gas turbine having an increased predicted lifetime and reduced potential of damages due to hot gas ingestion into the shroud cavity.

The method according to the invention comprises the application of a hot gas ingestion barrier to the shroud of a turbine blade following the operation in a gas turbine. The barrier extends along the edge of the blade shroud facing an adjacent blade shroud. The barrier is applied in particular to the edge of the shroud portion that is not damaged by creep deformation. The method further comprises the reduction of the mass of the blade shroud, where the reduction of mass at least compensates the addition of mass due to the application of the barrier such that the resulting overall mass of the blade shroud is equal or less than a non-reconditioned blade shroud.

A second method according to the invention comprises the application of a hot gas ingestion barrier to the shroud of a blade intended for first operation in a gas turbine and the reduction of the mass of the shroud in order to compensate the addition of mass due to the barrier. The barrier is placed on the shroud in same manner as in the first method described above.

During operation of the blade one portion of the shroud in the circumferential direction is frequently deformed by a lifting up of the shroud platform in the radial direction. A second portion in the circumferential direction remains intact or undeformed. The deformed portion of one blade shroud platform extends at a radial level away from the radial level of the adjacent shroud platform such that a gap is formed where hot gas from the turbine can flow between the two adjacent blade shrouds into the shroud cavity. The first measure of the method provides a new improved edge on the undeformed shroud portion that matches the deformed portion of the adjacent shroud such that the gap is again closed and a barrier to the hot gas ingestion is created.

The prevention of hot gas ingestion can also limit further creep deformation.

The reduction of mass of the shroud re-establishes the initial mass of the shroud or even reduces its mass compared to the initial mass. As a result, centrifugal forces on the shroud and associated stresses and deformations are limited.

A first preferred version of both first and second methods further comprises the application of a thermal barrier coating (TBC) onto the surface of the blade shroud that is exposed to the hot gas in the turbine. Any TBC or hard face systems of the state of the art may be used. The reduction of mass of the shroud must for these methods be in an amount equal to or greater than the mass added to the shroud by the barrier and the TBC in order to re-establish a mass equal to or less than the initial mass.

The first two measures according to the invention, the application of the barrier together with the reduction of mass prevent hot gas ingestion while the mass and balance of the shroud and blade are maintained or improved. The combination of these two measures allows a significant increase in lifetime of the blade. The third measure according to the invention, the application of a thermal barrier coating, reduces the heat flux into the shroud cavity by conduction and thus the metal temperature of the shroud, which effectively increases the blade lifetime.

The method avoids a complete redesign of the turbine blade and allows further operation of the blade at reduced cost and maintenance effort.

In a first preferred version of first and second methods, the applied barrier is a pre-fabricated and pre-shaped component that is fastened to the edge of the shroud platform.

In a second preferred version method of both first and second methods the barrier is realised by means of a layer-by-layer material build-up until a predetermined shape and size of barrier is attained. In both versions the barrier is placed between the knife-edges of the platform. The barrier is designed by calculation of the deformation expected during the next operation interval (in case of a blade already in use) or the during the first operation interval (in case of new turbine blade). The barrier shape is designed to match the predicted deformation of the adjacent shroud edge such that no gap between the two shrouds will form and hot gas leakage will be prevented.

In a particular version, the barrier is shaped having a consistent radial level over the entire extent along the shroud edge. In a further particular version, the barrier has a bowed or curved shape having its greatest radial extent about the center of the shroud edge and gradually sloping toward the knife-edges of the shroud.

The layer-by-layer build-up of material for the barrier is realised by any one of the following methods welding, laser cladding, high strength diffusion brazing, and spray techniques.

In a preferred version of first and second methods, the reduction of mass is realised by means of reducing the thickness of the front (or first) knife-edge in relation to the flow direction of the hot gas through the turbine. The reduction of thickness is preferably limited to the knife-edge of the deformed portion of the shroud. In a further version the reduction of thickness is also extended to the undeformed portion of the shroud.

The reduction in mass is realised by any suitable and conventionally known industrial machining method. It is performed in any case at locations in order to maintain the balance of the blade with blade shroud with respect to the blade root during operation.

BRIEF DESCRIPTION OF THE DRAWINGS

The invention according to the invention is illustrated in the accompanying drawings.

Same numerals refer to same components in all figures.

DETAILED DESCRIPTION OF THE PREFERRED EMBODIMENTS

Figure 1:
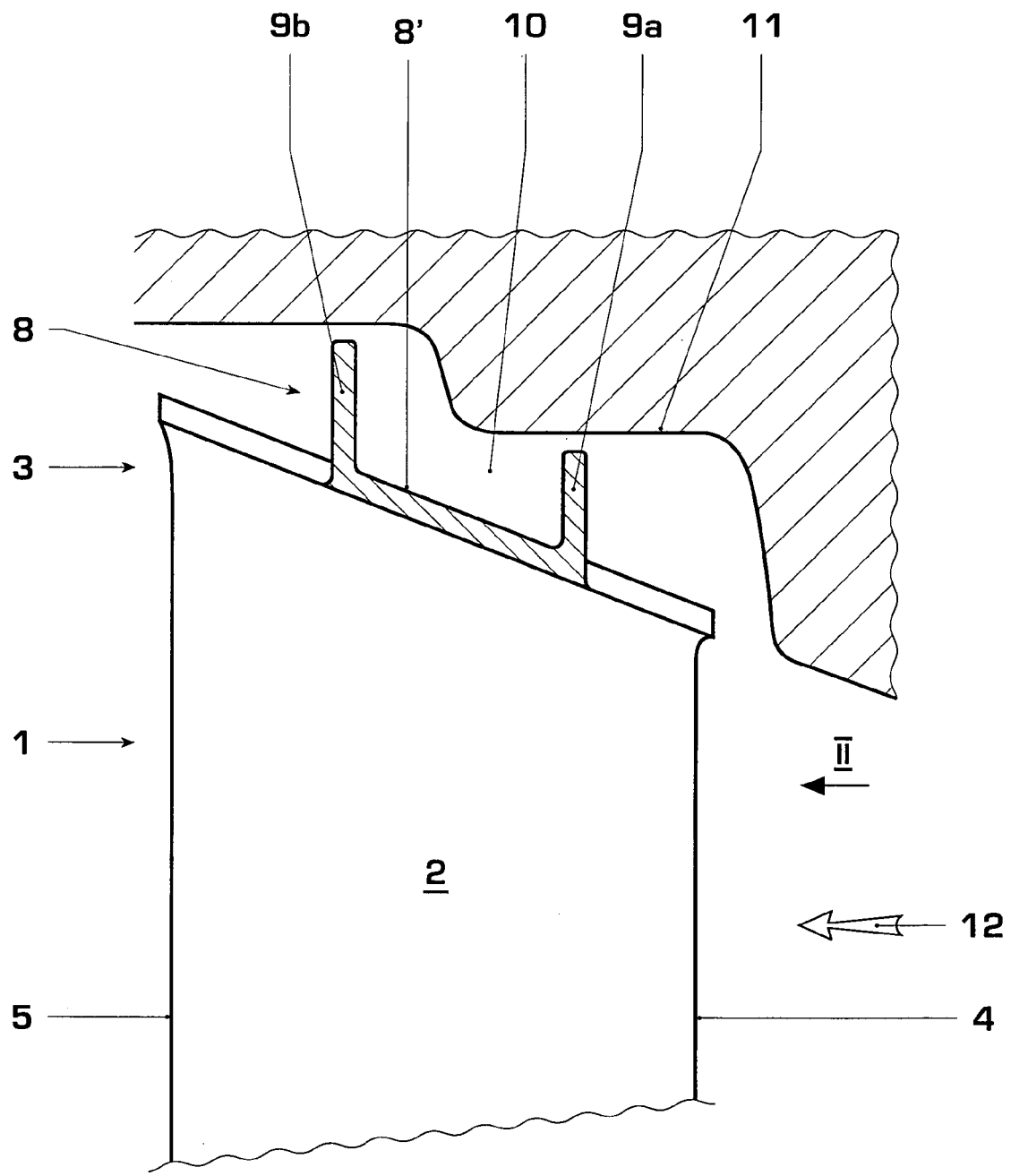
FIG. 1 shows a cross-sectional view of the shroud of a rotating blade and stationary component.

A rotating gas turbine blade 1 comprises a blade airfoil 2 with a blade tip 3, a leading edge 4 and a trailing edge 5 and a shroud 8 comprising a shroud platform 8' arranged on the blade tip 3 and knife-edges 9a, 9b that extend in the circumferential direction along the edges of the shroud platform 8'. The knife-edges 9a, 9b extend radially outward from the shroud platform 8' (with respect to the turbine rotor) and toward the inner casing wall 11 of the turbine. The shroud platform 8', the knife-edges 9a, 9b, and the casing wall 11 define a shroud cavity 10. The arrow 12 indicates the direction of the flow of the hot gas through the turbine during operation.

Figure 2:
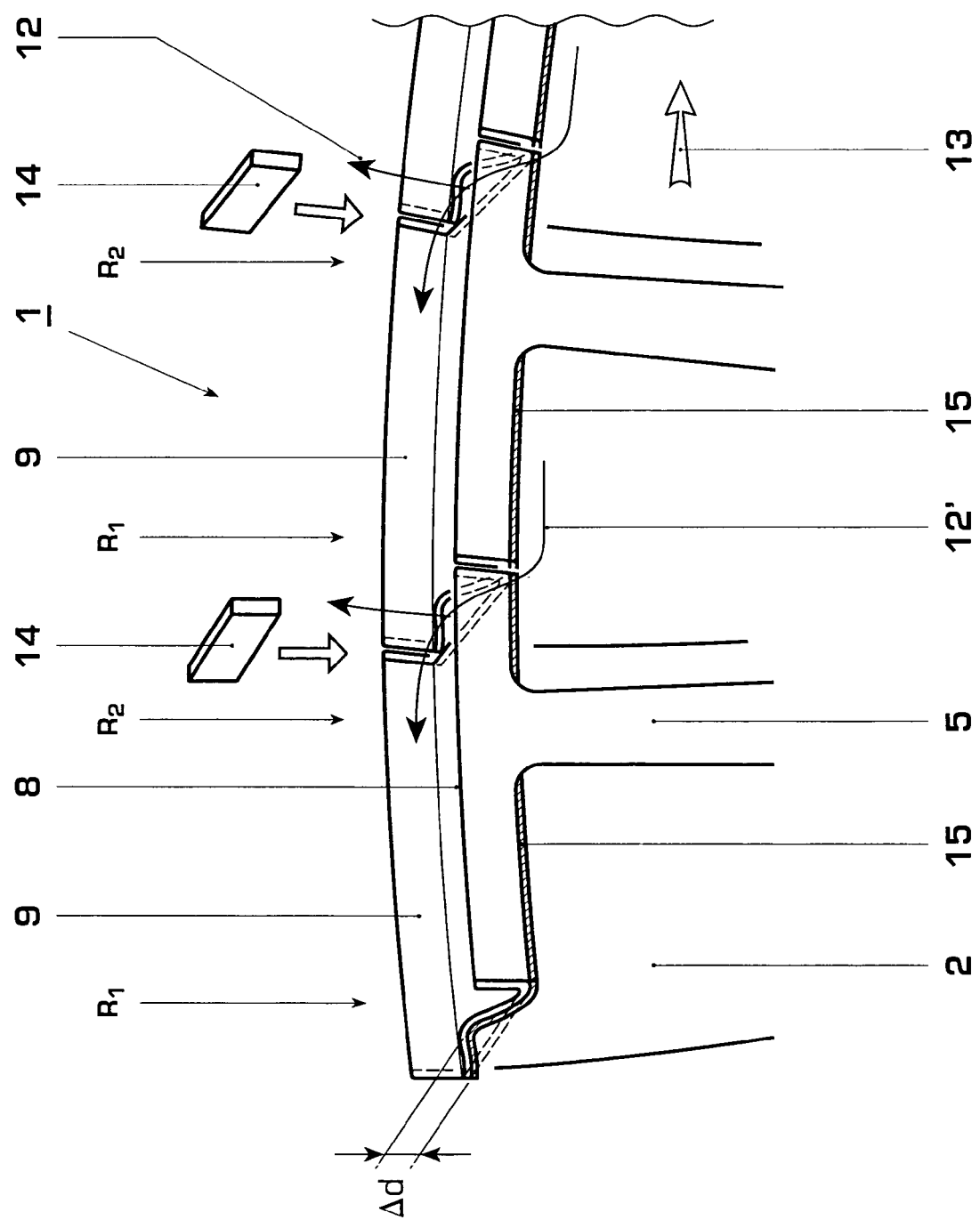
FIG. 2 shows typical creep deformations of shrouds found following an operation interval.
Figure 3:
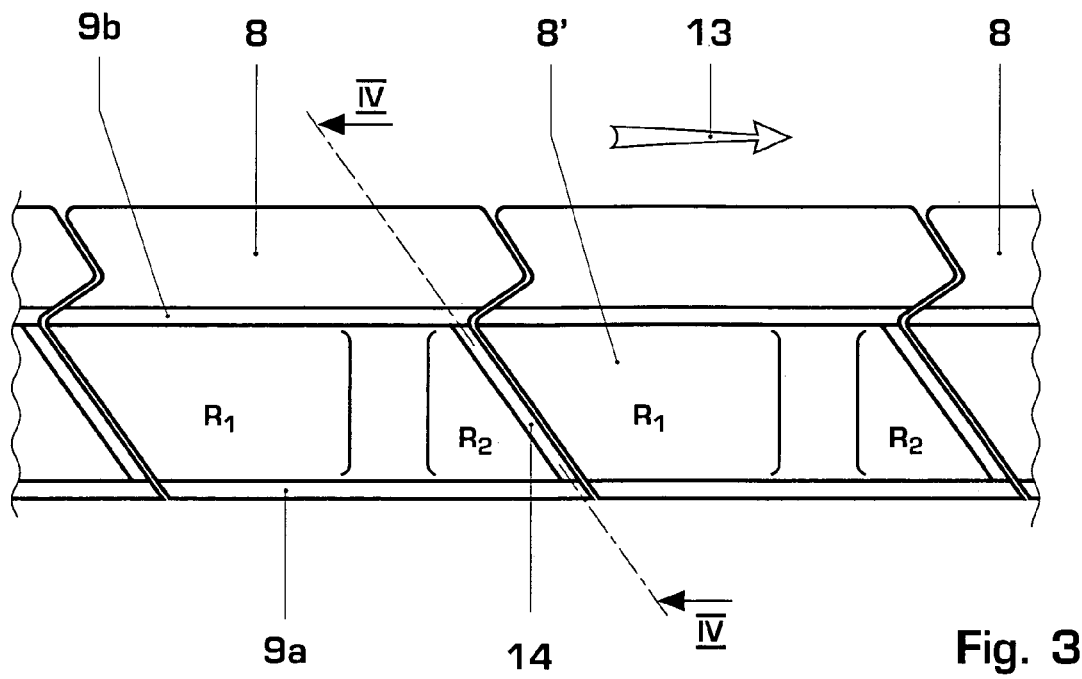
FIG. 3 shows a top view of the blade shrouds following the insertion of the barrier, FIGS. 4a and b show profile views of different barrier shapes in a view according to IV—IV in FIG. 2.

FIG. 2 shows a side view of three blades 1 in a blade row. The shroud is considered to have first and second regions R1 and R2 in the direction of rotation 13 respectively that are separated by a stiffening strut as shown in FIG. 3.

The edge of the first region R1 is creep deformed following an operation interval of the blade having as a result a bowed shape in the radial direction. The extent of the deformation is indicated by $\Delta d$. The broken line (radially inward from the deformation) indicates the original shroud edge prior to the operation interval. While R1 is affected by creep deformation, the second region R2 is not affected. The difference in degradation is due to the different extents of the two regions and a cantilever beam effect with respect to the airfoil resulting in different mechanical stresses due to centrifugal load. Furthermore, the thermal load is highest at the platform extremity, where a controlled hot gas leakage stream may enter the shroud cavity and thus increase metal temperature leading to long term creep deformation.

There is a mismatch of the edge of the deformed region R1 and the edge of region R2 of the adjacent shroud that allows the development of a gap, through which hot gas may leak into the shroud cavity. The arrow 12' indicates the direction of hot gas ingestion. Hot gas ingestion can cause overheating of the shroud cavity 10 and a resulting decrease of the blade's lifetime.

FIG. 2 shows the insertion of a pre-fabricated hot gas ingestion barrier 14 to be placed along the edge of the second (undeformed and intact) region R2. It has a shape and size at least matches the deformed edge of the adjacent shroud such that the two adjacent shroud edges overlap and the gap between them is closed. Preferably the barrier is designed to have a size and shape such that an overlap is assured during the entire next operation interval, in which further creep deformation can occur.

FIG. 3 shows a radially inward view of the shrouds 8 of two adjacent blades in a blade row. The shrouds 8 are arranged so that their end portions are in tight contact with one another such that hot gas cannot flow into the region of the shroud cavity. The arrow 13 indicates the direction of rotation of the blade row. The inserted barriers 14 extend between the knife-edges 9a and 9b and along the edges of the undeformed portion of the shroud. The barriers 14 have parallel walls that extend essentially radially and approximately at right angles to the shroud platform 8'. In a variant, the barriers 14 have a side wall facing the adjacent shroud that extends radially while the other side wall gradually slopes toward the shroud cavity 10 and shroud platform 8'.

Figure 4A:
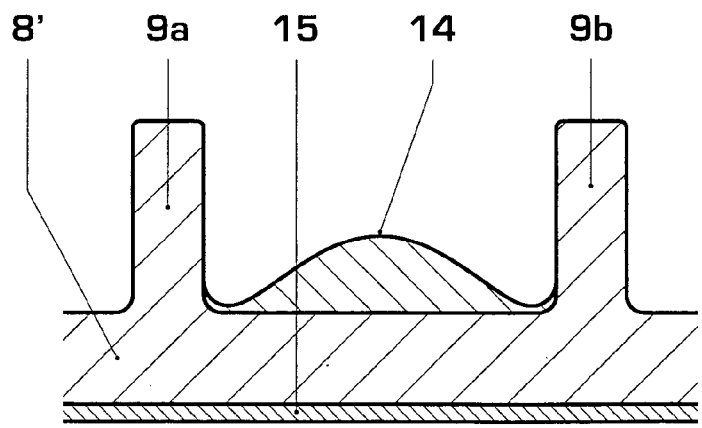
Figure 4B:
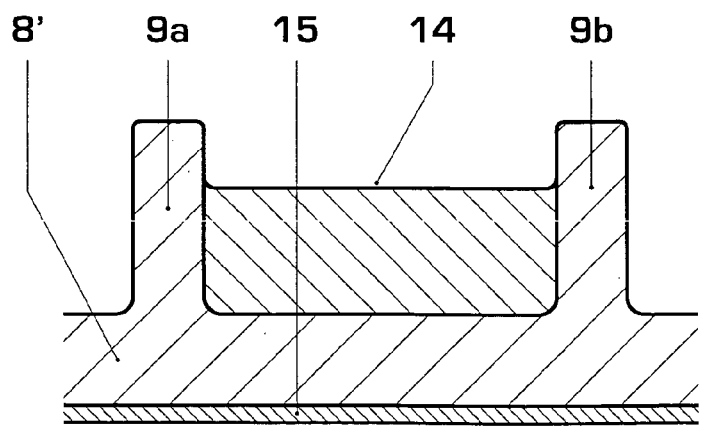

FIGS. 4a and 4b show in a cross-sectional view along IV—IV two further variants of a hot gas ingestion barrier, which may be used for the method according to the invention. FIG. 4a shows a barrier built-up by a layer-by-layer application of material. With increasing number of layers the lateral extent of the layers was reduced such that a sloping shape was attained with greatest height at the centre of the shroud edge. The material, for example nickel-based or cobalt-based super alloys, is applied layer by layer by welding, laser cladding, high strength diffusion brazing, or spray techniques such as plasma spraying or any other suitable known method. These materials as well as materials typically used for thermal barrier coatings are equally suitable material for the built-up barrier as well as for the pre-fabricated barrier. The barrier in FIG. 4a has a curved shape in order to match closely the creep deformation of the shroud of the adjacent blade and provide an overlap of the shroud edges such that no gap can develop. Preferably, the barrier has a height greater than the present deformation in order to assure an overlap also during the next operation interval when further deformation may be expected.

FIG. 4b shows a further possible shape of built-up barrier or pre-fabricated barrier, which assures an overlap in cases of deformation of greater extent.

The barrier according to FIG. 4b can additionally act as a stiffening rib, which reduces the amount of creep deformation for a given thermal and mechanical load.

The barrier, pre-fabricated or shaped by layer-by-layer material build-up, may be applied to a blade following an operation interval and having creep deformed portions in view of preventing hot gas ingestion in a further operation interval, in which further deformation must be expected. Such barrier can likewise be applied to new blades intended for first operation interval.

FIGS. 3 and 4a, 4b each show a thermal barrier coating 15 applied to the hot gas side surface of the shroud. This measure is optional and adds to the lifetime of the blade. The thermal barrier coating is applied by any known suitable method and using any known material suitable for the purpose of a thermal barrier. Such materials are for example yttria-stabilized zirconia with suitable composition and ceramic materials such as yttria, non-stabilized zirconia, ceria ($CeO2$), scandia ($Sc2O3$), or other oxides.

The shape and size of the hot-gas ingestion barrier is designed by means of calculation of the expected creep deformation of the first region during the next operation interval of the turbine blade (1). The height of the barrier is determined accordingly such that an overlap of the adjacent shroud edges is assured during the entire operation interval.

The mass reduction of the shroud according to the invention is intended to compensate for the increased mass due to the barrier and possibly the thermal barrier coating. It is most suitably directed to the thickness of the front knife-edge 9a, which is the first knife-edge in the direction of the hot gas flow 12 according to FIG. 1. The reduction of mass is preferably limited to the first region R1 as it is most effective in this region due to the cantilever effect under centrifugal load.

A further mass reduction is also possible by a reduction of thickness of the knife-edge 9a in the second region R2.

In any case, the location of all mass removal is selected in view of maintaining a balance of the blade and shroud during operation.

The mass can also be reduced by a reduction of the thickness of the shroud platform. Any of these reductions of mass can be realized by known industrial methods such as manual or CNC-high speed cutting, automated or manual grinding, electro-discharge machining, or waterjet machining.

The reduction of mass at least compensates for the mass added by the barrier and the thermal barrier coating if such a coating has been applied. Advantageously the mass is reduced in excess of the added mass such that the final mass is less than the initial mass of the shroud and centrifugal forces and associated stresses and deformations may be reduced.

REFERENCE NUMERALS

1 rotating blade of a gas turbine
2 blade airfoil
3 blade tip
4 leading edge
5 trailing edge
8 shroud
8' shroud platform
9a,9b knife-edge
10 shroud cavity
11 casing wall
12 hot gas flow in turbine
12' hot gas ingestion flow
13 direction of rotation of blade row
14 hot gas ingestion barrier
15 thermal barrier coating
$R_1$ first region, region deformed by creep
$R_2$ second Region, intact region
$\Delta d$ extent of creep deformation While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method of reconditioning a rotating turbine blade in a blade row following operation in a gas turbine, the turbine blade including a blade shroud for sealing between the tip of the blade and a stationary component positioned radially opposite of the tip of the blade, the shroud having a shroud platform, front and back knife-edges extending along the edges of the shroud platform in the circumferential direction and in the radial direction away from the shroud platform with respect to the turbine, the shroud platform, the knife-edges, and the stationary component defining a shroud cavity, the shroud having two ends each facing a shroud of an adjacent blade in the blade row, and the shroud element including a first region having a creep deformation following operation of the blade and a second region having no deformation following the operation of the blade, the method comprising:

applying a barrier to the edge of the second region of the shroud having no deformation where the barrier extends from the front knife-edge to the back knife-edge of the shroud and faces the shroud of the adjacent blade; and reducing the mass of the shroud by a mass equal to or greater than the mass of the applied barrier.

2. The method according to claim 1, further comprising:

applying a thermal barrier coating to surfaces of the shroud that are directly exposed to the hot gas of the turbine; and wherein reducing comprises reducing the mass of the shroud by a mass equal to or greater than the mass of the barrier together with the mass of thermal barrier coating.

3. The method according to claim 1, further comprising:

inserting a pre-fabricated barrier between the front and back knife-edges and along the edge of the second region of the shroud.

4. The method according to claim 1, wherein applying comprises applying a barrier by layer-by-layer building-up of material.

5. The method according to claim 4, wherein applying comprises applying the barrier by layer-by-layer welding, laser cladding, high strength diffusion brazing, or spraying.

6. The method according to claim 1, wherein the barrier is pre-fabricated or shaped by layer-by-layer build-up of a nickel-based or cobalt-based super-alloy.

7. The method according to claim 1, further comprising:
calculating the creep deformation of the first region of the shroud that is expected during the next operation interval of the turbine blade; and
determining the height of the barrier so that said barrier height will at least match the height of the expected creep deformation.

8. The method according to claim 1, wherein reducing comprises reducing the mass of the shroud by reducing the thickness of the front knife-edge at least in the first region.

9. The method according to claim 1, wherein reducing comprises reducing the mass of the shroud by reducing the thickness of the shroud platform.

10. The method according to claim 1, wherein reducing comprises reducing the mass of the shroud element by CNC-high speed cutting, automated or manual grinding, or electro-discharge machining.

11. A method of fabricating a rotating turbine blade in a blade row intended for first operation in a gas turbine, the turbine blade including
a blade shroud for sealing between the tip of the blade and a stationary component positioned radially opposite of the tip of the blade having a shroud platform, front and back knife-edges extending along the edges of the shroud platform in the circumferential direction and in the radial direction away from the shroud platform with respect to the turbine, the shroud platform, the knife-edges, and the stationary component defining a shroud cavity,
the shroud having two ends each facing a shroud of an adjacent blade in the blade row, and the shroud including a first region oriented toward the shroud of an adjacent blade in the direction opposite the direction of the rotation of the blade row and a second region oriented toward the shroud of an adjacent blade in the direction of rotation of the blade row,
the method comprising:
applying a barrier to the edge of the second region of the shroud where the barrier extends from the front knife-edge to the back knife-edge of the shroud and faces the shroud of the adjacent blade; and
reducing the mass of the shroud by a mass equal to or greater than the mass of the applied barrier.

12. The method according to claim 11, further comprising:
applying a thermal barrier coating to surfaces of the shroud that are directly exposed to the hot gas of the turbine; and
wherein reducing comprises reducing the mass of the shroud by a mass equal to or greater than the mass of the barrier together with the mass of thermal barrier coating.

13. The method according to claim 11, further comprising:
inserting a pre-fabricated barrier between the front and back knife-edges and along the edge of the second region of the shroud.

14. The method according to claim 11, wherein applying comprises applying a barrier by layer-by-layer building-up of material.

15. The method according to claim 14, wherein applying comprises applying the barrier by layer-by-layer welding, laser cladding, high strength diffusion brazing, or spraying.

16. The method according to claim 11, wherein the barrier is pre-fabricated or shaped by layer-by-layer build-up of a nickel-based or cobalt-based super-alloy.

17. The method according to claim 11, further comprising:
calculating the creep deformation of the first region of the shroud that is expected during the next operation interval of the turbine blade; and
determining the height of the barrier so that said barrier height will at least match the height of the expected creep deformation.

18. The method according to claim 11, wherein reducing comprises reducing the mass of the shroud by reducing the thickness of the front knife-edge at least in the first region.

19. The method according to claim 11, wherein reducing comprises reducing the mass of the shroud by reducing the thickness of the shroud platform.

20. The method according to claim 11, wherein reducing comprises reducing the mass of the shroud element by CNC-high speed cutting, automated or manual grinding, or electro-discharge machining.

* * * * *